(12) United States Patent
Jacquemard et al.

(10) Patent No.: US 11,008,942 B2
(45) Date of Patent: May 18, 2021

(54) LUBRICATING OIL PIPING GUTTER OF AN AIRCRAFT TURBOMACHINE

(71) Applicant: SAFRAN AIRCRAFT ENGINES, Paris (FR)

(72) Inventors: Christophe Paul Jacquemard, Moissy-Cramayel (FR); Didier Gabriel Bertrand Desombre, Moissy-Cramayel (FR); Serge René Morreale, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 119 days.

(21) Appl. No.: 16/522,535

(22) Filed: Jul. 25, 2019

(65) Prior Publication Data

US 2020/0032710 A1    Jan. 30, 2020

(30) Foreign Application Priority Data

Jul. 26, 2018  (FR) ...................................... 1856979

(51) Int. Cl.
*F16H 57/04* (2010.01)
*F02C 7/06* (2006.01)
*F01D 25/18* (2006.01)

(52) U.S. Cl.
CPC ............... *F02C 7/06* (2013.01); *F01D 25/18* (2013.01); *F16H 57/042* (2013.01)

(58) Field of Classification Search
CPC .......................... F16H 57/0423; F16H 57/0421
See application file for complete search history.

(56) References Cited

U.S. PATENT DOCUMENTS 6,223,616 B1 * 5/2001 Sheridan ............... F16H 1/2827
                                                                  184/6.12
2014/0064930 A1    3/2014 NguyenLoc et al.

FOREIGN PATENT DOCUMENTS

| EP | 1 923 540 A2 | 5/2008 |
|---|---|---|
| EP | 1 923 540 A3 | 1/2011 |
| FR | 3 052 522 A1 | 12/2017 |
| WO | 2014/112978 A1 | 7/2014 |
| WO | 2015/166189 A1 | 11/2015 |

OTHER PUBLICATIONS

International Search Report and Written Opinion dated Apr. 1, 2019, issued in corresponding French Application No. 1856979, filed Jul. 26, 2018, 8 pages.

* cited by examiner

*Primary Examiner* — Gerald L Sung
*Assistant Examiner* — Alyson Joan Harrington
(74) *Attorney, Agent, or Firm* — Christensen O'Connor Johnson Kindness PLLC

(57) ABSTRACT

The present disclosure describes a lubrication oil piping gutter of an aircraft turbomachine. The lubrication oil piping gutter can be used for a sun gear train reducer of the turbomachine. The gutter may include two lateral annular walls connected at their outer periphery by an annular bottom wall. In some embodiments, the annular bottom wall may include at least one oil evacuation opening in which is located a deflector configured to facilitate the flow of oil radially from the inside to the outside of the gutter.

10 Claims, 2 Drawing Sheets

LUBRICATING OIL PIPING GUTTER OF AN AIRCRAFT TURBOMACHINE

TECHNICAL FIELD

The present disclosure relates to the field of aircraft turbomachine, in particular, for double-flow turbomachine with a sun gear reducer. Oil piping devices for lubricating the reducer are also described here.

BACKGROUND

The background art includes US-A1-2014/064930, EP-A2-1923540, WO-A1-2014/112978, WO-A1-2015/166189 and FR-A1-3052522.

The sun gear reducer of a dual-flow turbomachine comprises, for example, a rotating outer ring gear and a planet carrier fixed to the stator. It is necessary to send a large oil flow of several thousand litres per hour to lubricate the reducer and avoid premature wear of the many parts rotating relative to each other.

The oil circulating in the reducer to lubricate the rolling elements and gear teeth is evacuated to the periphery by centrifugation. The oil needs to be recovered and ducted as efficiently as possible to (a) be cooled and then reinjected into the supply circuit of the reducer; (b) minimize hot oil projections outgoing of the reducer and thus limit (1) the heat exchanges between the oil and the casing bearing the reducer and (2) o the retention of oil in the enclosure of the reducer and therefore the size of the tank; (c) to limit oil consumption via the degassing circuit of the enclosure containing the reducer.

The purpose of the present disclosure is to meet these objectives in a simple and inexpensive way.

DISCLOSURE

The present disclosure concerns a lubrication oil piping gutter of an aircraft turbomachine, in particular for, a sun gear train reducer of this turbomachine. The lubrication oil piping gutter includes two lateral annular walls connected at their outer periphery by an annular bottom wall. The annular bottom wall includes at least one oil evacuation opening where a deflector is located and configured to facilitate the flow of oil radially from the inside to the outside of the gutter.

In a sun gear reducer, the lubricating oil leaving in the periphery is rotationally driven by the part of the reducer from which it is ejected by centrifugation. In the circular gutter that collects it, the lubricating oil forms a rotating oil film. Driven by this rotational movement, part of the oil film can pass in front of the opening without passing through it, which can lead to an accumulation of oil in the gutter. The presence of the deflector forces the oil film to pass through the opening and thus improves the evacuation of the oil that has lubricated the reducer.

According to the present disclosure, the deflector has a general L-shape and comprises a first wall extending substantially into the gutter and a second wall extending from the first wall to the outside of the gutter. This shape allows it to deflect outward, through the opening, an oil film passing into the gutter at the deflector.

In some embodiments, the deflector is a part attached into the gutter.

In further embodiments, the first wall extends substantially parallel to the annular bottom wall of the gutter, and the second wall extends substantially in a plane P passing through an axis X of revolution of the gutter.

In some embodiments, the second wall passes through the opening. In this embodiment, the second wall completely blocks the passage in the circumferential direction and forces all the rotating oil film that hits it to pass through the opening and to exit the gutter. It also limits oil projections downstream of the gutter at the outlet of the opening and facilitates oil recovery in the enclosure containing the reducer.

In some embodiments, the second wall delimits a first oil passage with a first edge of the opening and a second oil passage with an opposite second edge of the opening.

The first passage is used to pass the oil deflected by the second wall of the deflector, the second passage allows the passage of the oil recovered at the bottom of the gutter, downstream of the opening in the direction of rotation of the oil film. Depending on the engine's operating speeds, this oil may not have enough energy to go around the gutter and some of it goes down directly. It can then be evacuated through the second passage.

in some embodiments, the first wall covers the first edge of the opening.

This allows to confine radially the oil film upstream of the deflector to direct it towards the second wall.

In some embodiments, the deflector comprises lateral edges extending from the side of the lateral walls of the gutter, at least along the second wall.

On the one hand, these lateral edges stiffen the deflector to resist the vibrations of the reducer, and on the other hand, they confine the oil ejected in the plane of the gutter and thus improve its recovery.

In some embodiments, the opening is located at the point of the gutter which is intended to be its low point when installed on the reducer, so that this opening oriented down in the normal operating position of a turbomachine equipped with this gutter.

In some instances, the deflector extends over the entire axial dimension of the bottom wall.

In some embodiments, the gutter comprises radially outer lugs for fixing to an engine casing.

The present disclosure also concerns an aircraft turbomachine, comprising a sun gear train reducer comprising an outer cowl for recovering rotating mobile oil cowl and surrounded by at least one gutter as described below.

BRIEF DESCRIPTION OF THE FIGURES

The present disclosure shall be better understood, and other details, characteristics and advantages of this disclosure shall appear more clearly when reading the following description, with reference to the annexed drawings on which.

DETAILED DESCRIPTION

Figure 1:
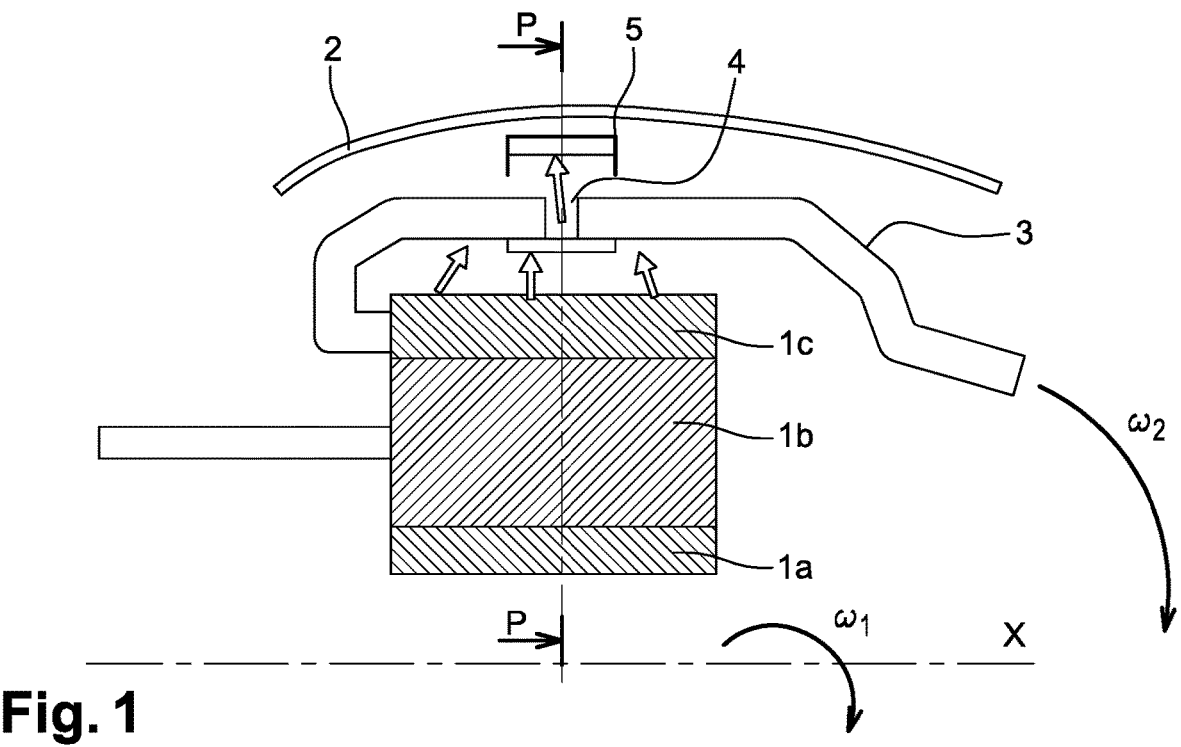
FIG. 1 shows a schematic cross-section of a sun gear reducer according to one embodiment.

FIG. 1 schematically shows a sun gear train reducer of a turbomachine, with an epicyclic gear train 1a-1b-1c, which is mounted in an enclosure 2. The innermost part 1a represents a sun gear input shaft in the form of an engine pinion, which is mounted by a spline connection on the turbine shaft, not shown, and which rotates at a specified speed ω1. The part 1b represents a planet carrier supporting, for example, three planets that mesh around the input shaft 1a. Here, the planet carrier is attached to the static parts of the turbomachine. The outer part 1c represents an outer ring gear that meshes with the planets. The dimension ratios between the different elements are arranged here so the outer ring gear 1c rotates at a speed ω2, reduced compared to the input shaft 1a, the planets rotating relative to the planet carrier 1b. This brief description illustrates the fact that, in such a device, many parts are in contact with relative movements and high forces, which requires a large quantity of oil for lubrication and cooling.

An oil inlet, not shown, brings oil into the central region 1a of the reducer to lubricate it. This oil passes through various active parts of the reducer, such as gears, by centrifugal drive and is driven radially outwards by centrifugation.

The ring gear 1c carries a cowl 3 rotating with it, shaped to recover the oil that has lubricated the reducer, whose path is represented by arrows, and guide it to exit orifices 4. In some embodiments, these orifices 4 are located in an area of maximum radius of cowl 3 to facilitate the evacuation of oil by centrifugation. In addition, they are generally several and, in some instances, uniformly distributed in circumference in a plane P perpendicular to the axis of rotation X.

An annular gutter 5 around the axis X according to the present disclosure surrounds the reducer in plane P, in order to recover the oil ejected from the cowl 3 of the ring gear 1c by centrifugation.

Figure 2:
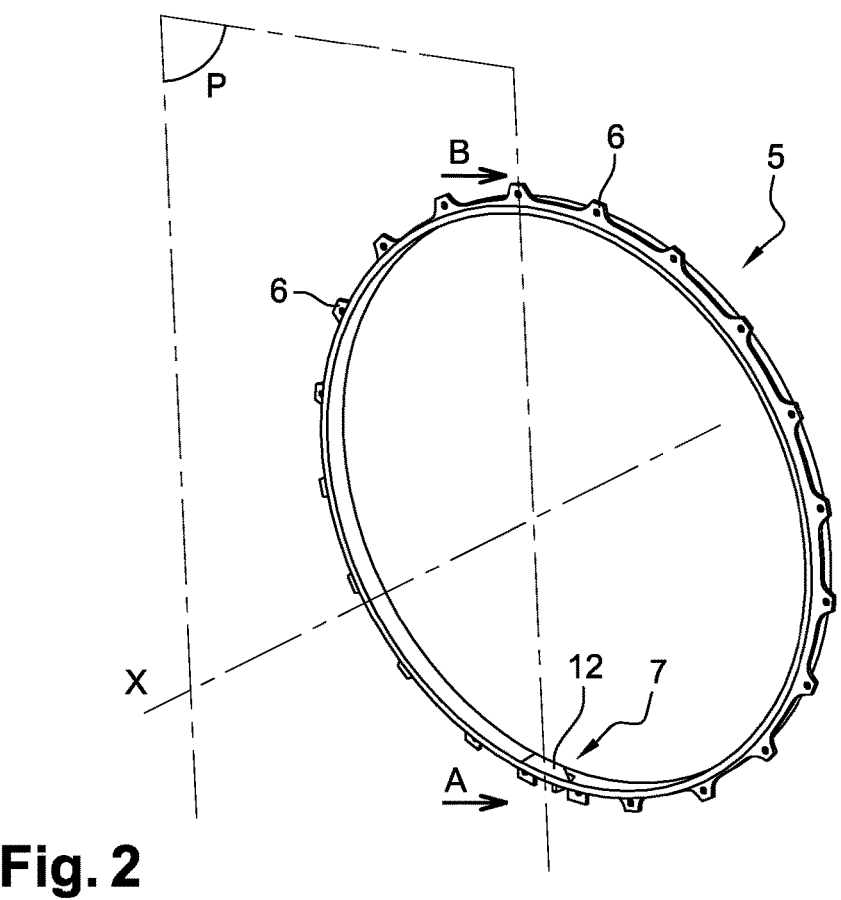
FIG. 2 shows a perspective view of a gutter according to the one embodiment.

In some embodiments, this annular gutter 5 is fixed to the enclosure 2 containing the reducer. FIG. 2 shows an overview of such an annular gutter 5, showing its lugs 6 for fixing to the enclosure and, at low point A, an opening 7 for evacuating the oil recovered in the gutter.

Figure 3:
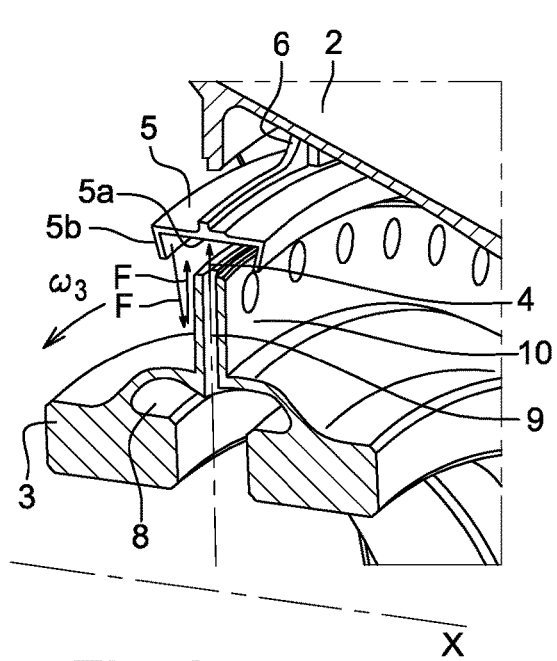
FIG. 3 shows a perspective view of a detail of the gutter according to the embodiment installed on the reducer at the high point, noted B in FIG. 2, in a cross section along an axial plane.

FIG. 3 shows a detail of an example of an embodiment of the part of the rotating cowl 3 with oil outlet orifices 4 and the annular gutter 5, at the high point B of the gutter, with reference to FIG. 2. The cowl 3 has an oil recovery cavity 8 and, in its centre, an annular row of oil ejection channels 9 substantially radial and leading to the orifices 4. These oil ejection channels 9 are formed between two flanges 10 which form a flat disc protruding from the surface of the cowl 3.

The annular gutter 5 is placed in front of the orifices 4 of the ejection channels 9. It has here a flat cylindrical bottom 5a and two lateral flanks 5b to confine the oil axially. In some embodiments, the lateral flanks 5b retract towards the centre of the gutter 5 going toward the axis X, giving, for example, the gutter 5 a radial dovetail profile.

The oil exits of the orifices 4 in jets which have a radial component as well as a tangential component since they are driven in rotation by the ejection channels 9. Therefore, the oil tends to form an annular film in the gutter that is driven in an overall rotating movement at a speed ω3 oriented in the same direction as the cowl 3 of the ring gear.

In addition, as indicated by the arrows F in FIG. 3, the inclined flanks 5b of the gutter 5 allow potential projections to be reintroduced. These are directed towards the walls of the central flanges 10 which send them back to the gutter 5 by centrifugation.

Figure 4:
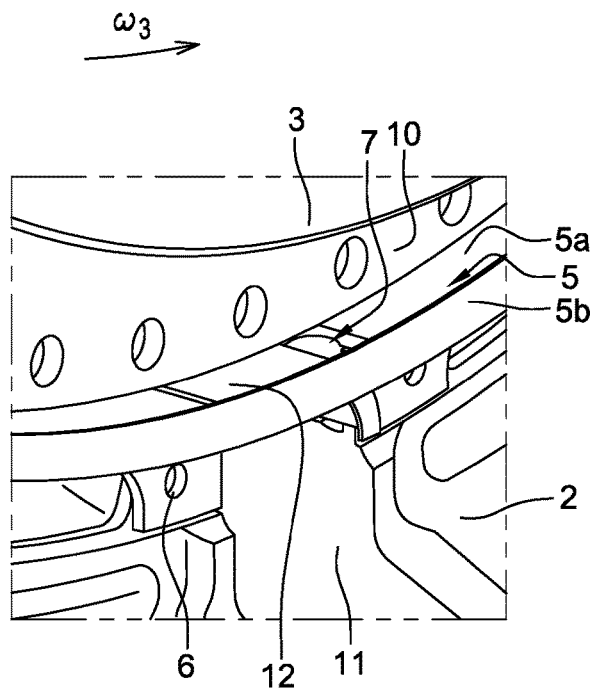
FIG. 4 shows a perspective view of a detail of the gutter according to the embodiment installed on the reducer at the low point, noted A in FIG. 2.

With reference to FIG. 4, at the low point A of the annular gutter 5, the bottom 5a of the latter has an opening 7 placed in front of a recovery port 11 of the enclosure 2, which is connected to an oil recovery circuit, not shown.

Figure 5:
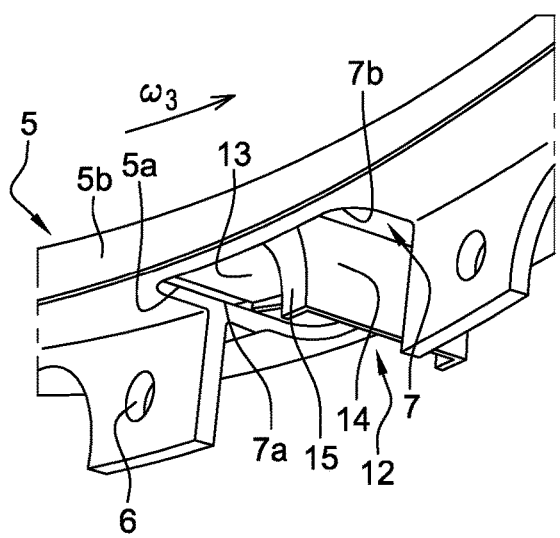
FIG. 5 shows a perspective view, seen from below, of a detail of the gutter according to the present disclosure alone at point A in FIG. 2.
Figure 6:
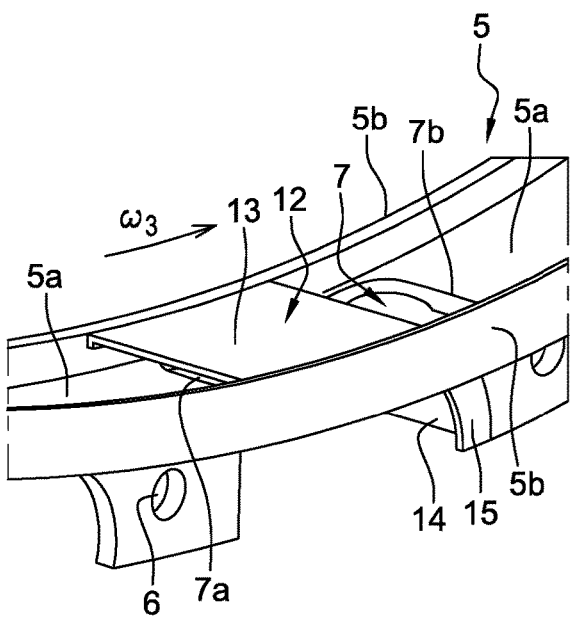
FIG. 6 represents a perspective view, seen from above, of a detail of the gutter according to the present disclosure alone at point A in FIG. 2.

To guide the rotating oil film in the gutter 5 to the recovery port 11, the gutter 5 is equipped with a deflector 12 whose shape is better visible in FIGS. 5 and 6.

The deflector 12 has a plate comprising a first part 13 substantially parallel to the bottom 5a of the gutter 5 which is placed between the lateral flanks 5b of the gutter substantially at their radial end, to allow the oil film to pass between the bottom 5a of the gutter and the plate 13. In some embodiments, the first part 13 is located at the opening 7 and between the peripheral edges of the lateral flanks 5b. The first part 13 of the plate starts a little upstream of the opening 7 in the bottom 5a of the gutter, following the direction of rotation ω3 of the oil film, and covers part of the opening 7. At this level, the first part 13 of the plate curves radially outwards and is extended in continuity by a second part 14 of the plate which passes radially through the opening 7. In some embodiments, the second part 14 extends significantly in the plane P which passes through the axis X of revolution of the gutter 5 (FIGS. 2 and 5). The deflector is thus mainly L-shaped facing outwards.

The plate 13-14 of the deflector has the same width as the inside of the gutter 5 by closing it substantially at the ends of the lateral flanks 5b in its upstream part.

In some embodiments, the second part 14 of the plate of the deflector has lateral flanks 15, particularly in its part that emerges radially outwards from the opening 7 of the gutter 5. Mechanically, these flanks 15 stiffen the part formed by the deflector 12 to avoid the vibration risks associated with the reducer.

The deflector 12 is positioned in the gutter 5 to leave, in the opening 7, a first free passage to the outside between the second part 14 of the plate and a first edge 7a of the opening 7 which is located upstream of the second part 14 of the plate.

The general L-shape of the deflector allows the oil film coming upstream to be ducted along the bottom 5a of the gutter in the direction of rotation of the speed ω3 and directed radially outwards through the first free passage along the second part 14 of the plate of the deflector. The position of the deflector 12 in the opening 7 also allows the oil film thus deflected radially to be directed towards the recovery port 11, thus limiting the extension to be provided for the recovery port 11 in the confinement enclosure 2.

In some embodiments, the flanks 15 of the reducer 12 confine in plane P the oil exiting of the gutter 5 and contribute to limiting the recovery zone to be provided in the enclosure 2.

Also, in some embodiments, the deflector 12 is positioned in the gutter 5 to leave a second free passage with a second edge 7b of the opening 7, downstream of the deflector 12 with respect to the direction of rotation ω3 of the oil film.

The second passage left in the opening 7 of the gutter downstream of deflector 12 prevents a possible risk of oil accumulation at low point A, especially during phases of operation of the reducer at low rotational speed. In this case, despite the rotational movement of the oil film in the gutter, which is constantly maintained by the oil jets, oil recovered downstream of the opening in the lower parts of the gutter can descend by gravity and flow towards the recovery port 11 through the passage.

We claim:

1. A lubrication oil piping gutter of an aircraft turbomachine, for a sun gear train reducer of the aircraft turbomachine, comprising:
    two lateral annular walls connected at their outer periphery by an annular bottom wall,
    the annular bottom wall includes at least one oil evacuation opening,
    a deflector located in the at least one oil evacuation opening, the deflector configured to facilitate a flow of oil radially from inside to outside of the lubrication oil piping gutter, wherein the deflector has a L-shape and comprises a first wall extending into the lubrication oil piping gutter and a second wall extending from the first wall to outside of the lubrication oil piping gutter.

2. The lubrication oil piping gutter according to claim 1, wherein the first wall extends parallel to the annular bottom wall of the lubrication oil piping gutter, and the second wall extends in a plane passing through an axis of revolution of the lubrication oil piping gutter.

3. The lubrication oil piping gutter according to claim 1, wherein the deflector is a part attached into the lubrication oil piping gutter.

4. The lubrication oil piping gutter according to claim 1, wherein the second wall passes through the at least one oil evacuation opening.

5. The lubrication oil piping gutter according to claim 1, wherein the second wall delimits a first oil passage with a first edge of the at least one oil evacuation opening and a second oil passage with an opposite second edge of the at least one oil evacuation opening.

6. The lubrication oil piping gutter according to claim 5, wherein the first wall covers the first edge of the at least one oil evacuation opening.

7. The lubrication oil piping gutter according to claim 1, wherein the deflector comprises lateral edges extending from a side of each of the lateral annular walls of the lubrication oil piping gutter, at least along the second wall.

8. The lubrication oil piping gutter according to claim 1, wherein the deflector extends over an entire axial dimension of the annular bottom wall.

9. The lubrication oil piping gutter according to claim 1, further including: radially outer lugs for fixing to an engine casing.

10. An aircraft turbomachine, comprising a sun gear train reducer including an outer cowl for recovering rotating mobile oil and surrounded by at least one lubrication oil piping gutter according to claim 1.

* * * * *